United States Patent
Slavens et al.

(10) Patent No.: US 10,066,549 B2
(45) Date of Patent: Sep. 4, 2018

(54) VARIABLE VANE SEGMENT

(71) Applicant: United Technologies Corporation, Hartford, CT (US)

(72) Inventors: Thomas N. Slavens, Moodus, CT (US); Brooks E. Snyder, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 194 days.

(21) Appl. No.: 14/706,033

(22) Filed: May 7, 2015

(65) Prior Publication Data

US 2015/0322860 A1 Nov. 12, 2015

Related U.S. Application Data

(60) Provisional application No. 61/989,749, filed on May 7, 2014.

(51) Int. Cl.
| | |
|---|---|
| *F02C 7/12* | (2006.01) |
| *F01D 9/04* | (2006.01) |
| *F01D 9/02* | (2006.01) |
| *F01D 25/08* | (2006.01) |
| *F01D 25/12* | (2006.01) |

(52) U.S. Cl.
CPC ............. *F02C 7/12* (2013.01); *F01D 9/02* (2013.01); *F01D 9/041* (2013.01); *F01D 25/08* (2013.01); *F01D 25/12* (2013.01); *F05D 2220/32* (2013.01); *F05D 2240/12* (2013.01); *F05D 2260/20* (2013.01); *F05D 2260/201* (2013.01); *Y02T 50/676* (2013.01)

(58) Field of Classification Search
CPC ... F02C 7/12; F01D 9/02; F01D 9/041; F01D 25/08; F01D 25/12; F05D 2220/32; F05D 2240/12; F05D 2260/20; F05D 2260/201; Y02T 50/676
USPC .......................................................... 60/806
See application file for complete search history.

(56) References Cited

U.S. PATENT DOCUMENTS

| | | | | |
|---|---|---|---|---|
| 3,032,314 A | * | 5/1962 | David ..................... | F01D 5/182 416/90 R |
| 3,301,527 A | * | 1/1967 | Kercher ................. | F01D 5/189 415/115 |

(Continued)

FOREIGN PATENT DOCUMENTS

| | | |
|---|---|---|
| EP | 2613004 | 7/2013 |
| WO | 2012041728 | 4/2012 |

OTHER PUBLICATIONS

Extended European Search Report for Application No. 15166621.1 dated Jan. 27, 2016.

*Primary Examiner* — Peter Helvey
(74) *Attorney, Agent, or Firm* — Carlson, Gaskey & Olds, P.C.

(57) ABSTRACT

A variable vane pack includes an inner platform, an outer platform, radially outward of the inner platform, a plurality of vanes connecting the inner platform to the outer platform, wherein the outer platform comprises a platform body and an impingement plate, the impingement plate having a radially inward impingement plate, a radially outward pressure distribution plate, and an impingement plenum defined between the radially inward impingement plate and the radially outward pressure distribution plate.

14 Claims, 6 Drawing Sheets

(56) References Cited

U.S. PATENT DOCUMENTS

| | | | | |
|---|---|---|---|---|
| 4,064,300 A * | 12/1977 | Bhangu | F23R 3/002 | 428/120 |
| 4,077,205 A * | 3/1978 | Pane | F23R 3/08 | 60/757 |
| 4,105,364 A * | 8/1978 | Dodd | F01D 5/189 | 415/115 |
| 4,269,032 A * | 5/1981 | Meginnis | F23R 3/002 | 416/97 A |
| 4,312,186 A * | 1/1982 | Reider | F23R 3/002 | 60/754 |
| 4,422,300 A * | 12/1983 | Dierberger | F23R 3/007 | 60/753 |
| 4,485,630 A * | 12/1984 | Kenworthy | B23P 15/00 | 416/97 R |
| 4,695,247 A * | 9/1987 | Enzaki | F23R 3/002 | 431/351 |
| 4,887,663 A * | 12/1989 | Auxier | F02K 1/822 | 165/47 |
| 5,083,422 A * | 1/1992 | Vogt | F01D 5/188 | 60/752 |
| 5,265,409 A * | 11/1993 | Smith, Jr. | F02C 7/105 | 29/888.012 |
| 5,634,766 A | 6/1997 | Cunha et al. | | |
| 5,687,572 A * | 11/1997 | Schrantz | F23R 3/007 | 431/352 |
| 6,000,908 A * | 12/1999 | Bunker | F01D 5/189 | 165/908 |
| 6,237,344 B1 | 5/2001 | Lee | | |
| 6,276,897 B1 * | 8/2001 | Tarada | F01D 5/186 | 415/115 |
| 6,554,563 B2 * | 4/2003 | Noe | F01D 5/189 | 415/115 |
| 6,681,578 B1 * | 1/2004 | Bunker | F23R 3/005 | 60/759 |
| 6,701,714 B2 * | 3/2004 | Burd | F23M 5/02 | 60/752 |
| 6,708,499 B2 * | 3/2004 | Pidcock | F23R 3/002 | 60/752 |
| 6,722,134 B2 * | 4/2004 | Bunker | F01D 5/286 | 165/133 |
| 6,736,192 B2 * | 5/2004 | Chang | F28F 13/02 | 165/47 |
| 6,749,395 B1 * | 6/2004 | Reichert | F01D 17/14 | 415/115 |
| 6,761,031 B2 * | 7/2004 | Bunker | F23M 5/085 | 60/39.37 |
| 6,984,102 B2 * | 1/2006 | Bunker | F01D 5/187 | 415/115 |
| 7,097,418 B2 | 8/2006 | Trindade et al. | | |
| 7,104,067 B2 * | 9/2006 | Bunker | F23R 3/005 | 60/752 |
| 7,182,576 B2 * | 2/2007 | Bunker | F01D 5/187 | 29/889.2 |
| 7,217,088 B2 * | 5/2007 | Albrecht | F01D 5/18 | 415/115 |
| 7,219,498 B2 * | 5/2007 | Hadder | F23R 3/007 | 60/752 |
| 7,270,175 B2 * | 9/2007 | Mayer | F01D 25/08 | 165/170 |
| 7,766,609 B1 * | 8/2010 | Liang | F01D 9/041 | 415/138 |
| 7,862,291 B2 * | 1/2011 | Surace | F01D 9/041 | 415/115 |
| 7,921,654 B1 * | 4/2011 | Liang | F01D 5/186 | 415/115 |
| 8,109,724 B2 * | 2/2012 | Malecki | F01D 5/189 | 416/90 R |
| 8,127,553 B2 * | 3/2012 | Ekkad | F23R 3/06 | 165/908 |
| 8,162,594 B2 * | 4/2012 | Guimbard | F01D 5/189 | 415/115 |
| 8,187,369 B2 * | 5/2012 | Rogers | B01D 53/0446 | 428/141 |
| 8,305,755 B2 * | 11/2012 | Dede | F28F 7/00 | 165/185 |
| 8,307,657 B2 * | 11/2012 | Chila | F23R 3/06 | 431/350 |
| 8,438,856 B2 * | 5/2013 | Chila | F23R 3/002 | 60/752 |
| 8,444,376 B2 * | 5/2013 | Krueckels | F01D 5/187 | 415/116 |
| 8,511,969 B2 * | 8/2013 | Durocher | F01D 5/18 | 415/115 |
| 8,661,780 B2 * | 3/2014 | Wettstein | F02C 1/08 | 60/39.511 |
| 8,667,682 B2 * | 3/2014 | Lee | B21K 3/00 | 29/890.01 |
| 8,814,507 B1 * | 8/2014 | Campbell | F01D 5/08 | 415/139 |
| 8,826,668 B2 * | 9/2014 | Lee | F01D 5/186 | 165/908 |
| 8,920,110 B2 * | 12/2014 | Anguisola McFeat | F01D 5/186 | 415/115 |
| 8,956,116 B2 * | 2/2015 | Ahmad | F01D 5/081 | 415/116 |
| 8,973,365 B2 * | 3/2015 | Corr | F23R 3/002 | 181/207 |
| 9,010,125 B2 * | 4/2015 | Morrison | F01D 9/023 | 60/752 |
| 9,016,067 B2 * | 4/2015 | Gerendas | F23R 3/06 | 60/752 |
| 9,021,811 B2 * | 5/2015 | Lam | F23C 7/004 | 239/399 |
| 9,080,458 B2 * | 7/2015 | Romanov | F01D 11/08 | |
| 9,145,779 B2 * | 9/2015 | Joe | F01D 9/04 | |
| 9,157,328 B2 * | 10/2015 | Pope | F01D 5/186 | |
| 9,217,568 B2 * | 12/2015 | Cunha | F23R 3/06 | |
| 9,239,165 B2 * | 1/2016 | Cunha | F23R 3/002 | |
| 9,243,801 B2 * | 1/2016 | Cunha | F23R 3/002 | |
| 9,334,754 B2 * | 5/2016 | Khanin | F01D 5/187 | |
| 9,335,049 B2 * | 5/2016 | Cunha | F23R 3/005 | |
| 9,416,970 B2 * | 8/2016 | Kirsopp | F23R 3/002 | |
| 9,488,064 B2 * | 11/2016 | Perrot | F04D 29/563 | |
| 9,803,559 B2 * | 10/2017 | Burdick | F02C 9/20 | |
| 2007/0295011 A1 * | 12/2007 | Suciu | F01D 5/022 | 60/772 |
| 2009/0317247 A1 * | 12/2009 | Hoecker | F01D 9/04 | 415/213.1 |
| 2012/0093633 A1 * | 4/2012 | Kasibhotla | F01D 9/02 | 415/173.3 |
| 2012/0177478 A1 | 7/2012 | Giri et al. | | |
| 2012/0240590 A1 * | 9/2012 | Hellat | F01D 25/08 | 60/772 |
| 2013/0034435 A1 * | 2/2013 | Propheter-Hinckley | F01D 9/041 | 415/208.1 |
| 2013/0051972 A1 | 2/2013 | Romanov | | |
| 2013/0189110 A1 | 7/2013 | Batt et al. | | |
| 2013/0205793 A1 | 8/2013 | Xu | | |
| 2014/0000283 A1 * | 1/2014 | Spangler | F01D 25/12 | 60/806 |
| 2014/0047843 A1 * | 2/2014 | Papple | F01D 5/187 | 60/726 |
| 2014/0255177 A1 * | 9/2014 | Cadieux | F01D 9/042 | 415/208.1 |
| 2014/0271101 A1 * | 9/2014 | Slavens | F01D 5/187 | 415/1 |
| 2015/0027129 A1 * | 1/2015 | Franitza | F02C 7/18 | 60/782 |
| 2015/0322860 A1 * | 11/2015 | Slavens | F01D 9/02 | 60/806 |
| 2016/0010465 A1 * | 1/2016 | Slavens | F01D 5/186 | 415/115 |
| 2016/0208627 A1 * | 7/2016 | Boeke | F01D 9/023 | |
| 2016/0251974 A1 * | 9/2016 | Slavens | F01D 25/12 | 60/806 |

(56) References Cited

U.S. PATENT DOCUMENTS

| | | | | |
|---|---|---|---|---|
| 2016/0290158 | A1* | 10/2016 | Slavens | F01D 9/04 |
| 2016/0298484 | A1* | 10/2016 | Teixeira | F01D 5/186 |
| 2017/0226893 | A1* | 8/2017 | Slavens | F01D 25/12 |
| 2017/0234154 | A1* | 8/2017 | Downs | F01D 25/12 |
| | | | | 415/177 |
| 2017/0234218 | A1* | 8/2017 | Cupini | F02C 3/22 |
| | | | | 60/772 |

* cited by examiner

VARIABLE VANE SEGMENT

CROSS-REFERENCE TO RELATED APPLICATION

This application claims priority to U.S. Provisional Application No. 61/989,749 filed on May 7, 2014.

STATEMENT REGARDING GOVERNMENT SUPPORT

This invention was made with government support under Contract No. N00014-09-D-0821-0006 awarded by the United States Navy. The Government has certain rights in this invention.

TECHNICAL FIELD

The present disclosure relates generally to variable vanes for gas turbine engines, and more particularly to a cooling system for a variable vane segment.

BACKGROUND

Gas turbine manufacturers rely on high turbine inlet temperatures to provide boosts to overall engine performance. In typical modern engine applications, gas path temperatures within a turbine section exceed the melting point of the component constituent materials. Due to this, dedicated cooling air is extracted from the compressor, or elsewhere in the turbine engine, and used to cool the gas path components in the turbine.

Another feature implemented within some gas turbine engines is rotating vanes disposed within the flow path of the gas turbine engine. The rotating vanes allow the vane position to be altered in response to varying conditions, thereby improving flow through the gas turbine engine during operation. Rotating vanes (alternately referred to as variable vanes) require extra cooling and high pressure cooling supplies to operate. The need for high pressure cooling air supply becomes largely apparent in the low-pressure implementations of the rotating vane, where the thinner airfoils necessitate a larger supply pressure to accommodate the needed cooling air for the airfoil. This high pressure leads to difficulty in developing cooling configurations for the platforms of the airfoil and dialing back flow losses into the gas-path.

SUMMARY OF THE INVENTION

A variable vane pack according to an exemplary embodiment of this disclosure, among other possible things includes: an inner platform; an outer platform, radially outward of the inner platform; a plurality of vanes connecting the inner platform to the outer platform; wherein the outer platform includes a platform body and an impingement plate, the impingement plate having a radially inward impingement plate, a radially outward pressure distribution plate, and an impingement plenum defined between the radially inward impingement plate and the radially outward pressure distribution plate.

In a further embodiment of the foregoing variable vane pack, the plurality of vanes includes at least one static vane and at least one variable vane.

In a further embodiment of the foregoing variable vane pack, the at least one variable vane includes an outer cooling air feed protruding through the outer platform and the impingement plate, and wherein each of the outer cooling air feed is operable to receive cooling airflow.

In a further embodiment of the foregoing variable vane pack, the radially outward pressure distribution plate includes a plurality of slots, each of the slots being operable to allow distributed airflow into the impingement plenum.

In a further embodiment of the foregoing variable vane pack, each of the slots overlap at least one other of the slots in an axial direction along an axis defined by a curvature of the variable vane segment.

In a further embodiment of the foregoing variable vane pack, each of the slots circumferentially overlaps at least one other of the slots.

In a further embodiment of the foregoing variable vane pack, each of the slots is scalloped shaped.

In a further embodiment of the foregoing variable vane pack, the radially inward impingement plate includes a plurality of impingement openings operable to allow cooling air to move from the impingement plenum to the outer platform.

In a further embodiment of the foregoing variable vane pack, the plurality of impingement openings are approximately evenly distributed across a surface of the impingement plate.

In a further embodiment of the foregoing variable vane pack, the impingement plate includes a single sheet of material, and wherein the pressure distribution plate includes a single sheet of material.

Another featured embodiment includes a method for cooling an engine component including providing a cooling air feed to the engine components; passing the cooling air through a pressure distribution plate into an impingement plenum, thereby providing an even distribution of air pressure to the impingement plenum; and feeding the cooling air through impingement openings in an impingement plate, thereby impinging cooling air on a radially outward platform of the engine component and cooling the radially outward platform.

Another embodiment according to any of the previous embodiments includes passing the cooling air through a pressure distribution plate into an impingement plenum includes passing cooling air through a plurality of slots in the distribution plate.

In another embodiment according to any of the previous embodiments each of the slots overlaps at least one adjacent slot along an axis defined by the curvature of the engine component.

In another embodiment according to any of the previous embodiments includes each of the slots circumferentially overlaps at least one adjacent slot.

Another embodiment according to any of the previous embodiments includes cooling air exits the impingement plenum at least one of a joint between the engine component and an adjacent engine component, and a plurality of openings in the radially outward platform.

Another embodiment according to any of the previous embodiments includes feeding the cooling air through a plurality of impingement openings in an impingement plate, includes providing a plurality of impingement airflows to the radially outward platform from the plurality of impingement openings and wherein each of the plurality of impingement airflows has an approximately even pressure, thereby achieving an even cooling airflow pressure gradient across the radially outward platform.

Another embodiment according to any of the previous embodiments includes providing cooling air to each vane in the engine component through at least one outer cooling air feed and wherein cooling air provided to the outer cooling air feed and the pressure distribution plate are provided by the same air feed.

A gas turbine engine pack according to an exemplary embodiment of this disclosure, among other possible things includes a compressor section; a combustor section in fluid fluidly connected to the compressor section via a primary flowpath; a turbine section fluidly connected to the combustor section by the primary flowpath; a plurality of vane packs disposed circumferentially in the primary flowpath such that a vane stage is formed in the flowpath; and wherein each of the vane packs includes: an inner platform; an outer platform, radially outward of the inner platform; a plurality of vanes connecting the inner platform to the outer platform; wherein the outer platform includes a platform body and an impingement plate, the impingement plate having a radially inward impingement plate, a radially outward pressure distribution plate, and an impingement plenum defined between the radially inward impingement plate and the radially outward pressure distribution plate.

In a further embodiment of the foregoing gas turbine engine, each radially outward pressure distribution plate includes a plurality of slots, each of the slots axially and circumferentially overlapping at least one other of the slots, and wherein each of the slots provides a cooling air flowpath from an outer cooling plenum to the impingement plenum.

In a further embodiment of the foregoing gas turbine engine the radially inward impingement plate includes a plurality of impingement openings operable to allow cooling air to move from the impingement plenum to the outer platform.

These and other features of the present invention can be best understood from the following specification and drawings, the following of which is a brief description.

DETAILED DESCRIPTION OF AN EMBODIMENT

Figure 1:
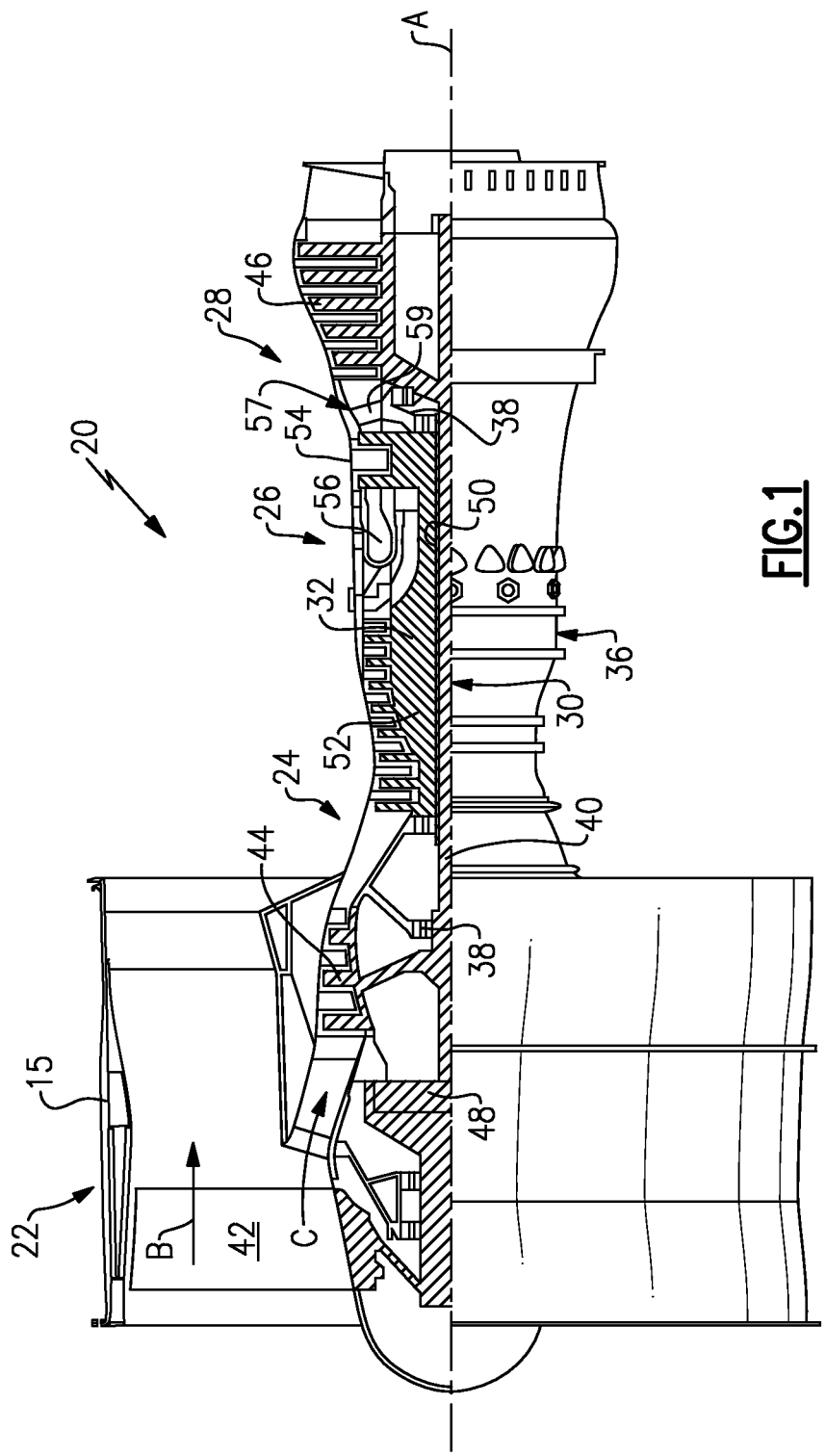
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R.)/(518.7° R.)]0.5$. The "Low corrected fan tip speed" as disclosed herein according to one non-limiting embodiment is less than about 1150 ft/second.

Figure 2:
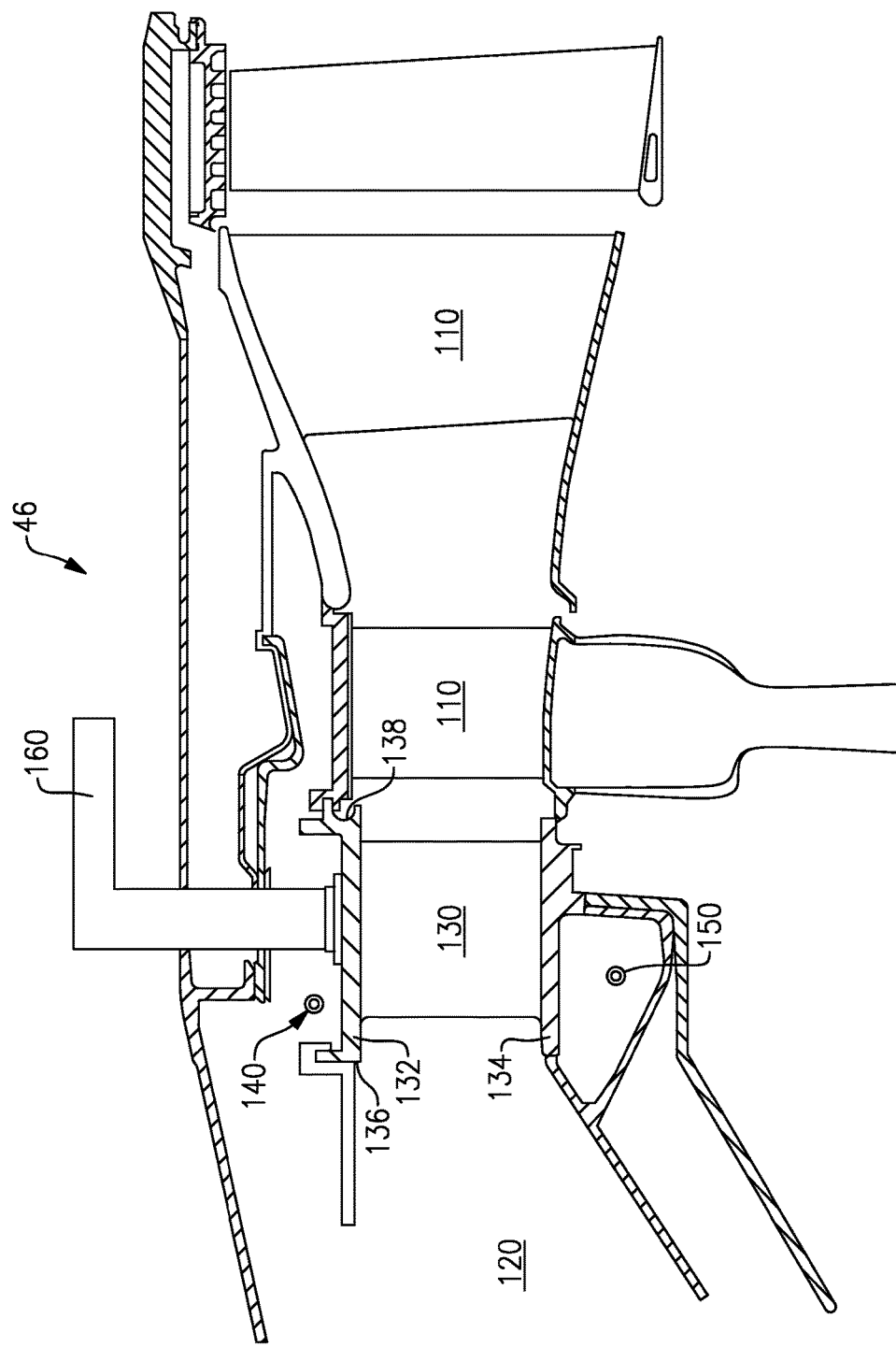
FIG. 2 schematically illustrates an example low pressure turbine section of the gas turbine engine of FIG. 1.

With continued reference to FIG. 1, FIG. 2 illustrates a low pressure turbine section 46 of FIG. 1 in greater detail. The low pressure turbine section 46 includes multiple rotors 110 disposed in the primary flowpath 120. Multiple variable vanes 130 are disposed in the flowpath 120 at the entrance to the low pressure turbine section 46. In a typical gas turbine engine 20, the variable vanes 130 are grouped in vane packs that are then arranged circumferentially within the primary flowpath 120 at an entrance to the low pressure turbine section 46. These vanes 130 are referred to as the first stage vanes.

Figure 3:
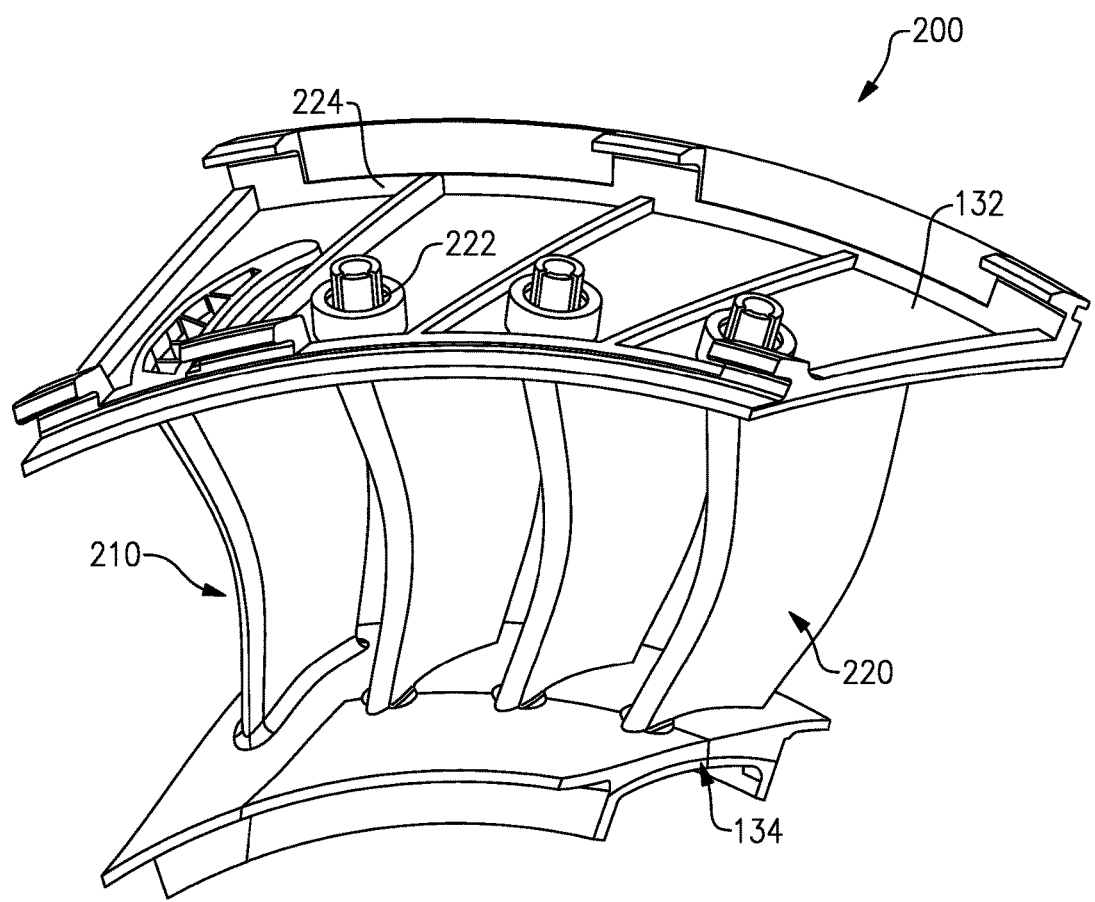
FIG. 3 schematically illustrates an isometric view of a vane pack for use in the example low pressure turbine section of FIG. 2.

With continued reference to FIGS. 1 and 2, FIG. 3 illustrates an isometric view of a vane pack 200. The vane pack 200 includes one stationary vane 210 supporting an outer platform 132 and an inner platform 134. Disposed between the platforms 132, 134 are three rotating vanes 220. Alternate configurations utilizing alternate numbers of rotating vanes 220 can also be utilized in the manner described herein with minimal modification. The rotating vanes 220 are supported by bearings 222 each of which includes a cooling air feed 224. The rotational position of the rotating vanes 220 at any given time is controlled via a control arm 160. Thermal gradients across the outer platform 132 typically occur due to uneven heating or cooling of the outer platform 132 and can lead to significant deflections of the outer platform 132. In some cases, a radial deflection resulting from a thermal gradient can damage or destroy the bearings 222 or the vane pack 200, necessitating maintenance and repairs.

Radial thermal gradients are generally minimized using a combination of thermal barrier coatings and film cooling. However, large axial thermal gradients from a leading edge 136 to trailing edge 138 of the outer platform 132 can also exist. In other terms, an axial thermal gradient can occur along an axis defined by the curvature of the vane pack 200. The thermal gradient can cause additional thermal deflections through the centers of the bearings 222 supporting the variable vanes 220 and damage or destroy the variable vanes 220. To counter this effect, the cooling configuration is tailored to create a thermal profile that is generally uniform in both the circumferential and axial directions of the vane outer platform 132.

Referring again to FIG. 2, and with continued reference to FIG. 3, an outer diameter cooling air circumferential plenum 140 is disposed radially outward of the variable vane pack 200 and provides pressurized cooling air to the outer platform 132 and the variable vanes 130 within the variable vane pack 200. A second cooling air circumferential plenum 150 is disposed radially inward of the variable vane pack 200 and receives at least a portion of the spent cooling air after the spent cooling air has passed through the variable vane pack 200. Cooling air is fed to the outer diameter cooling air circumferential plenum 140 through a series of pipes (not shown) positioned circumferentially around the case of the turbine engine 20. In some examples these pipes direct relatively cool air from the compressor section 24 to the outer diameter cooling air circumferential plenum 140. In other examples, these pipes draw cooling air from another high pressure air source. The air feed from the cooling air pipes results in an uneven circumferential and axial pressure distribution on the outer platform 132, absent a component for mitigating the uneven distribution.

In order to ensure that sufficient cooling air is being provided to the feed openings 224 of the variable vanes, the air pressure in the outer cooling air circumferential plenum 140 is a significantly high pressure relative to the pressure within the flow path. The significant pressure differential required to enable cooling airflow exacerbates the previously described circumferential and axial cooling gradients.

In order to address the uneven circumferential and axial pressure distribution of the cooling air, an impingement baffle 210 (See FIGS. 4A, 4B, and 5) can be connected to the outer platform 132. The impingement baffle 210 distributes the air pressure evenly before allowing the cooling air to contact, and thereby cool, the outer platform 132. At the same time the impingement baffle 210 provides no impediment to cooling air from the cooling air plenum 140 entering the variable vane 220 cooling air feeds 224.

With continued reference to FIGS. 1-3, FIG. 4A illustrates a partial view of the vane pack 200 of FIG. 3 with the inclusion of an impingement baffle 210. The impingement baffle 210 includes an outer pressure distribution plate 220 and a radially inner impingement plate 230, each of which traverse circumferentially around the outer platform 132 of the vane pack 200. The plates 220, 230 overlap each other in that the pressure distribution plate 221 completely overlaps the impingement plate 230 in the radial direction. Defined between the pressure distribution plate 221 and the impingement plate 230 is an impingement plenum 231. In some examples, the outer pressure distribution plate 221 is formed of a continuous sheet of a material, such as a metal sheet, and the inner impingement plate 230 is formed of a continuous sheet of material, such as a sheet of metal.

The pressure distribution plate 221 and the impingement plate 230 are placed such that the pressure distribution plate 221 is attached to a forward end 250 and an aft end 260 of the outer platform 130 and no air communicates from the cooling air plenum 140 (illustrated in FIG. 2) to the impingement plenum 231, except through the pressure distribution plate 221. In one example the pressure distribution plate 221 and the impingement plate 230 are connected to a forward rail at the forward end 250 and an aft rail at the aft end 260 of the outer platform 130.

To supply air to the impingement plenum 231, and thus to the impingement plate 230, slots 240 are included in the pressure distribution plate 221. In the illustrated example, the slots 240 are scalloped shaped. The slots 240 include a primary longitudinal direction aligned with the axial direction of the engine and allow cooling air to flow from the outer plenum 140 to the impingement plenum 231. The scalloped shape of the illustrated slots 240 allows for an even cooling air pressure distribution to be provided to the impingement plenum 231 in both the axial and circumferential direction. The slots 240 partially overlap in the axial direction allowing for more even axial distribution of air to the impingement plenum 231. In alternate examples, the slots 240 are not limited to the illustrated and described scalloped shape, but can be any shape as suitable for a given system.

Figure 4A:
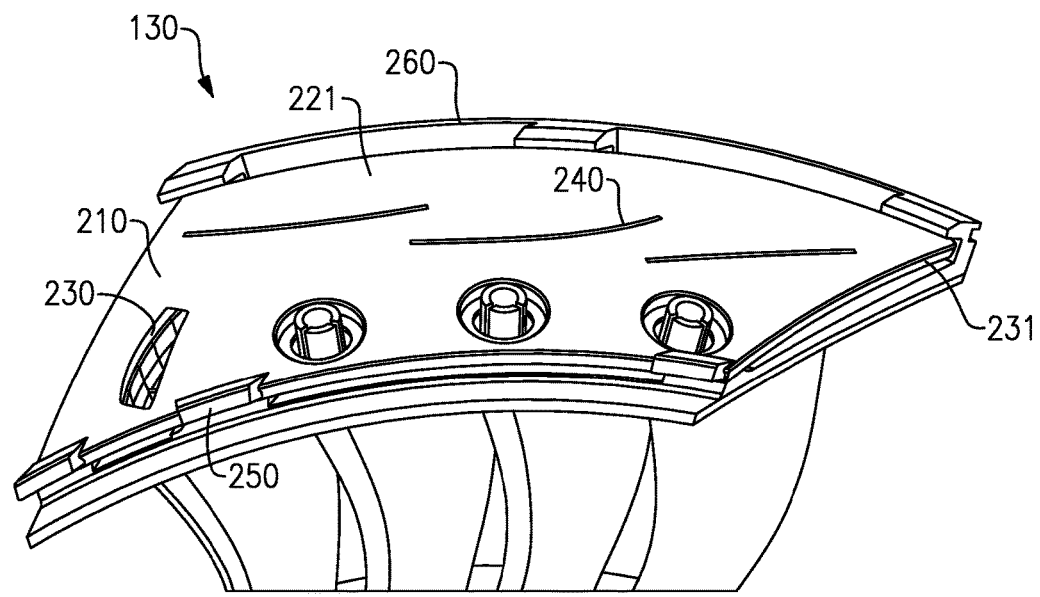
FIG. 4A schematically illustrates a top platform of the vane pack of FIG. 2 including a full impingement plate.
Figure 4C:
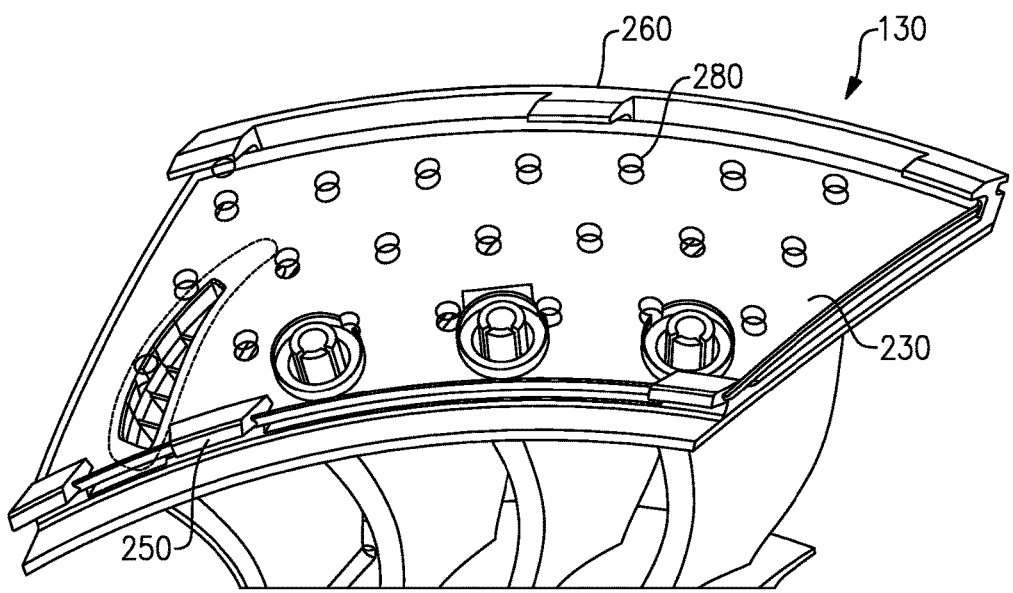
FIG. 4C schematically illustrates the top platform of FIG. 4 with the pressure distribution plate removed.
Figure 4B:
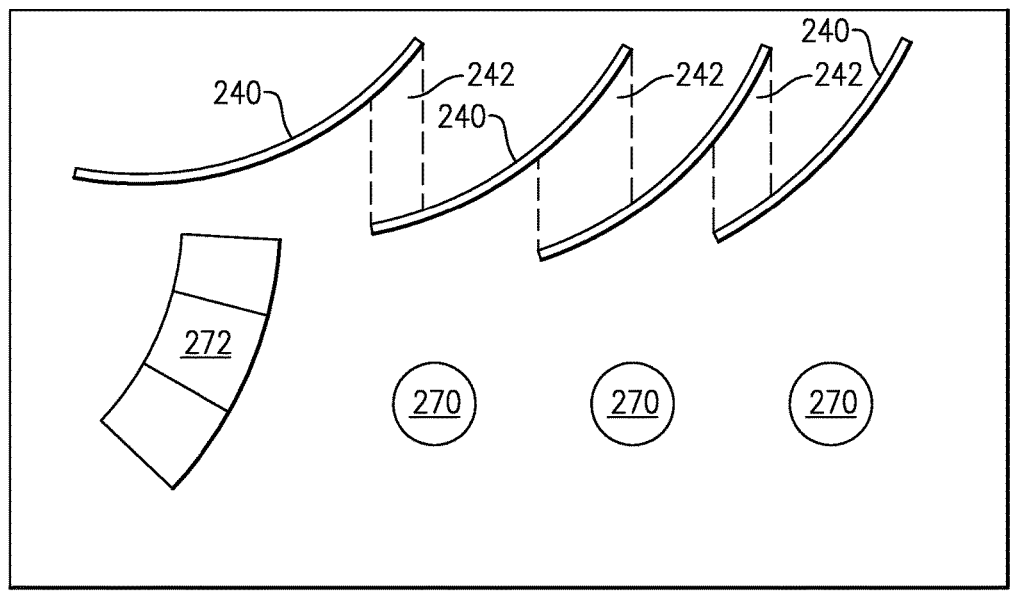
FIG. 4B schematically illustrates a top view of a pressure distribution plate of the impingement plate of FIG. 4.
Figure 5:
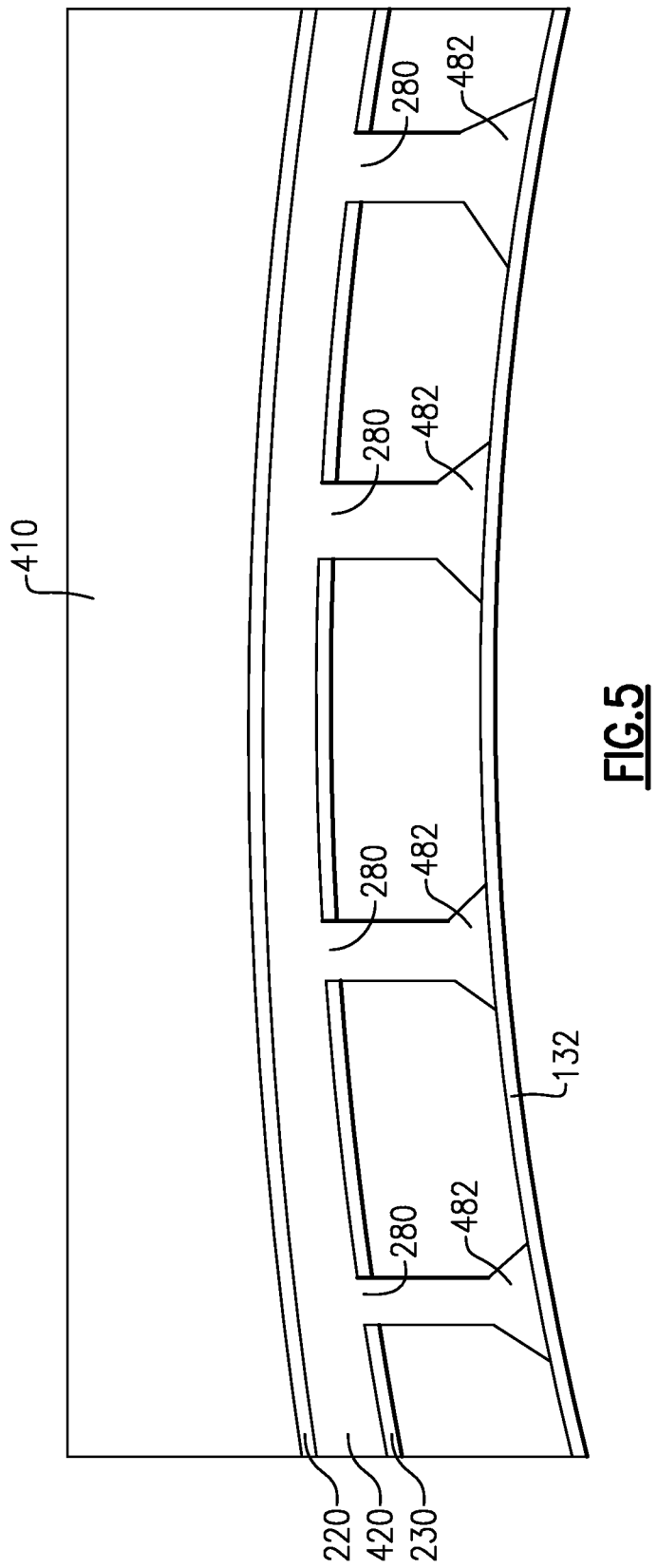
FIG. 5 schematically illustrates a gas flow through an impingement plate of a vane pack.

FIG. 4B schematically illustrates a top view of the pressure distribution plate 221 of FIG. 4A. The pressure distribution plate 221 includes the slots 240 described above, as well as multiple rotating vane feeds 270 and a stationary vane feed 272. Each of the slots 240 overlaps at least one adjacent slot 240 in an overlapping region 242. The overlapping regions 242 provide both an axial overlap (along the axis defined by the vane pack 200) and a circumferential overlap (along the circumference of the vane pack 200). While illustrated herein as a generally parabolic shape, the particular shape of the slots 240 can be designed by one of skill in the art, having the benefit of this disclosure, to meet the specific requirements of a given system. Furthermore, one of skill in the art, having the benefit of this disclosure, will understand that the slots 240 can be uniform or non-uniform depending on the needs of a particular system.

With continued reference to FIGS. 1-4B, FIG. 4C illustrates the vane pack 200 of FIG. 4A without the pressure distribution plate 221. The pressure distribution plate 221 is removed for illustrative purposes to provide a view of the impingement plate 230.

The outer platform is cooled by the provision of jets of air from the impingement plenum 231. The jets impinge on the outer platform 132, and are referred to as impingement cooling jets 482 (illustrated in FIG. 5). To generate impingement cooling jets 482 for cooling the outer platform 132, the impingement plate 230 includes multiple impingement cooling openings 280 disposed evenly about the surface of the impingement plate 230. In the illustrated example the impingement cooling openings 280 are circular holes. In alternate examples the impingement cooling openings 280 can be any shape, as dictated by the requirements of a given system. The even distribution of impingement cooling openings 280 provides high convective cooling uniformly across the backside of the outer platform 132. In alternate examples, the distribution of the cooling openings 280 can be disposed intentionally unevenly across the impingement plate 230 to compensate for an uneven heat flux from the gas path of the turbine 20. In the alternate examples, the impingement cooling openings 280 are denser in higher temperature zones and less dense in low temperature zones.

With continued reference to FIGS. 1-4C, FIG. 5 illustrates a gas path of cooling airflow in the above described vane pack 200. Initially cooling air originates from the outer diameter plenum 140 at a high pressure. The cooling air is passed through slots (not shown) in the pressure distribution plate 221 into an impingement plenum 420 defined between the pressure distribution plate 221 and the impingement plate 230. The passage of the cooling air through the pressure distribution plate reduces the pressure of the cooling air in addition to ensuring an even pressure distribution in the impingement plenum. The cooling air escapes from the impingement plenum 420 through impingement openings 280 in the impingement plate 230. The escaping air forms impingement jets 482 that impinge upon the outer diameter platform 132 of the vane pack 200, thereby cooling the outer diameter platform 132.

In one example, the cooling air impinged upon the outer diameter platform 132 escapes from a gap defined between the impingement plate 230 and the outer diameter platform 132 through a joint between the vane pack 200 and the adjacent vane packs. In alternate examples, the cooling air can escape through small holes in the outer platform 132 into the primary flow path C (illustrated in FIG. 1).

While the above described vane pack and cooling method are described with regards to a low pressure turbine section, it is understood that the principles described herein can be applied to any variable vane configuration and location and are not limited to a variable vane pack for a low pressure turbine section of a gas turbine engine. In one alternate example the cooling method described herein is applied to a backside combustor panel cooling system. In another example system, the method can be applied to blade outer air seal cooling in high pressure situations. In both the enumerated alternate examples, one of skill in the art having the benefit of this disclosure can adapt the above described system to the alternative example with minimal modification.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A variable vane pack comprising:
an inner platform;
an outer platform, radially outward of said inner platform;
a plurality of vanes connecting said inner platform to said outer platform; and
wherein the outer platform comprises a platform body and an impingement baffle, the impingement baffle having a radially inward impingement plate, a radially outward pressure distribution plate, and an impingement plenum defined between said radially inward impingement plate and said radially outward pressure distribution plate.

2. The variable vane pack of claim 1, wherein said plurality of vanes comprises at least one static vane and at least one variable vane.

3. The variable vane pack of claim 2, wherein said at least one variable vane comprises an outer cooling air feed protruding through said outer platform and said impingement plate, and wherein each of said outer cooling air feed is operable to receive cooling airflow.

4. The variable vane pack of claim 1, wherein said radially outward pressure distribution plate comprises a plurality of slots, each of said slots being operable to allow distributed airflow into said impingement plenum.

5. The variable vane pack of claim 4, wherein each of said slots overlap at least one other of said slots in an axial direction along an axis defined by a curvature of said variable vane segment.

6. The variable vane pack of claim 4, wherein each of said slots circumferentially overlaps at least one other of said slots.

7. The variable vane pack of claim 4, wherein each of said slots is scalloped shaped.

8. The variable vane pack of claim 1, wherein said radially inward impingement plate comprises a plurality of impingement openings operable to allow cooling air to move from said impingement plenum to said outer platform.

9. The variable vane pack of claim 8, wherein said plurality of impingement openings are approximately evenly distributed across a surface of said impingement plate.

10. The variable vane pack of claim 1 wherein said impingement plate comprises a first single sheet of material, and wherein said pressure distribution plate comprises a second single sheet of material.

11. The variable vane pack of claim 1, further comprising a cooling plenum defined between the impingement plate and the platform body.

12. The variable vane pack of claim 11, wherein the cooling plenum and the impingement plenum at least partially overlap.

13. The variable vane pack of claim 1, wherein the pressure distribution plate completely overlaps the impingement plate in the radial direction.

14. The variable vane pack of claim 1, wherein approximately 100% of air provided through the impingement plate is provided through the pressure distribution plate.

* * * * *